(12) United States Patent
Koenen

(10) Patent No.: US 11,346,315 B2
(45) Date of Patent: May 31, 2022

(54) BATTERY PACK FOR POWERING AND CONTROLLING OUTDOOR POWER EQUIPMENT

(71) Applicant: Briggs & Stratton, LLC, Wauwatosa, WI (US)

(72) Inventor: Robert Koenen, Pewaukee, WI (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 0 days.

(21) Appl. No.: 17/320,879

(22) Filed: May 14, 2021

(65) Prior Publication Data

US 2021/0270226 A1 Sep. 2, 2021

Related U.S. Application Data

(63) Continuation of application No. 16/213,576, filed on Dec. 7, 2018, now Pat. No. 11,015,565.

(Continued)

(51) Int. Cl.
*F02N 11/08* (2006.01)
*F02N 11/14* (2006.01)
(Continued)

(52) U.S. Cl.
CPC ........ *F02N 11/0862* (2013.01); *F02D 31/001* (2013.01); *F02D 31/002* (2013.01); *F02D 41/067* (2013.01); *F02D 41/3005* (2013.01); *F02N 11/14* (2013.01); *H01M 50/20* (2021.01); *A01D 34/64* (2013.01); *A01D 69/02* (2013.01); *A01D 2101/00* (2013.01); *H01M 2220/20* (2013.01); *H04L 67/12* (2013.01)

(58) Field of Classification Search
CPC ...... H02J 7/00; H02J 7/00032; H02J 7/00034; F02N 11/0862; F02N 11/12; F02N 11/14; H01M 50/20; H01M 50/202; H01M 2200/20; F02D 31/001; A01D 34/00; A01D 34/001; A01D 34/6818; A01D 2101/00; A01D 69/00; B60L 58/10
USPC .................................... 701/50, 113; 172/35
See application file for complete search history.

(56) References Cited

U.S. PATENT DOCUMENTS 4,702,201 A 10/1987 Odo et al.
5,212,952 A 5/1993 Yokoyama et al.
(Continued)

*Primary Examiner* — Robert A Werner
(74) *Attorney, Agent, or Firm* — Foley & Lardner LLP

(57) ABSTRACT

A battery pack includes a housing, rechargeable lithium-ion battery cells enclosed in the housing, terminals, a processing circuit, and a communications interface. The processing circuit is configured to control a supply of electrical power from the rechargeable lithium-ion battery cells to a positive terminal and a negative terminal in response to receiving signals from data terminals. The signals from the data terminals include operational information that includes at least a condition of an electric motor on power equipment coupled with the data terminals. The communications interface is configured to communicate over a wireless communication protocol to receive an identification of a type of power equipment coupled with the plurality of terminals. The processing circuit is configured to adjust one or more functions of the battery pack based upon identification data received from the communications interface, which includes the type of power equipment that is coupled with the plurality of terminals.

20 Claims, 8 Drawing Sheets

Related U.S. Application Data

(60) Provisional application No. 62/596,510, filed on Dec. 8, 2017.

(51) Int. Cl.
| | | |
|---|---|---|
| *F02D 31/00* | (2006.01) | |
| *F02D 41/30* | (2006.01) | |
| *F02D 41/06* | (2006.01) | |
| *H01M 50/20* | (2021.01) | |
| H04L 67/12 | (2022.01) | |
| A01D 101/00 | (2006.01) | |
| A01D 69/02 | (2006.01) | |
| A01D 34/64 | (2006.01) | |

(56) References Cited

U.S. PATENT DOCUMENTS

| | | |
|---|---|---|
| 9,127,658 B2 | 9/2015 | Koenen et al. |
| 9,802,500 B1* | 10/2017 | Penilla .................... B60L 58/21 |
| 9,809,127 B2* | 11/2017 | Duhaime .............. H01M 50/20 |
| 9,917,460 B2 | 3/2018 | Koenen et al. |
| 10,389,141 B2* | 8/2019 | Roumi ...................... H02J 7/00 |
| 2004/0021377 A1 | 2/2004 | Mazuka et al. |
| 2004/0257038 A1 | 12/2004 | Johnson et al. |
| 2007/0285049 A1 | 12/2007 | Krieger et al. |
| 2016/0046199 A1* | 2/2016 | Butler ................... B60L 53/305 |
| | | 320/106 |
| 2016/0049819 A1 | 2/2016 | Butler et al. |
| 2018/0202407 A1 | 7/2018 | Harvey et al. |
| 2019/0033395 A1* | 1/2019 | Karner ................. G01R 31/392 |
| 2019/0107096 A1 | 4/2019 | Koenen et al. |
| 2019/0237829 A1 | 8/2019 | Lo |
| 2020/0055405 A1* | 2/2020 | Duan ..................... B60L 58/13 |

\* cited by examiner

BATTERY PACK FOR POWERING AND CONTROLLING OUTDOOR POWER EQUIPMENT

CROSS-REFERENCE TO RELATED PATENT APPLICATIONS

This application claims the benefit of U.S. patent application Ser. No. 16/213,576, filed Dec. 7, 2018, which claims the benefit of U.S. Provisional Application No. 62/596,510, filed Dec. 8, 2017, the contents of which are incorporated herein by reference in their entirety.

BACKGROUND

The present disclosure relates to an intelligent battery pack having controls and circuitry for controlling one or more aspects of an internal combustion engine of outdoor power equipment, such as a lawn tractor. More specifically, the present disclosure relates to a battery pack that includes specifically designed terminals and an internal unit to power and control various features within the internal combustion engine, or on the electronic power equipment itself.

Presently, many different types of outdoor power equipment include electronic starting circuits that allow the user to start the internal combustion engine of the outdoor power equipment through either a key switch or a push button. Most of these starting systems include a lead acid battery that provides the voltage and current required for activating the starting system of the outdoor power equipment. In many cases, the lead acid battery is a 12-volt battery that is recharged during operation of the outdoor power equipment.

Although lead acid batteries have been used for a very long time and are relatively inexpensive, if the voltage stored by the lead acid battery is completely depleted, the lead acid battery may become ineffective at storing a charge and would thus need to be replaced. Since many pieces of outdoor power equipment can sit idle for extended periods of time, if the lead acid battery is not removed and kept charged, the lead acid battery can become completely discharged and thus must be replaced. In cases of newly purchased equipment, this replacement may fall under the manufacturer's warranty and would need to be replaced by the manufacturer.

Presently, many types of lawn and garden equipment utilize a lithium ion battery pack to provide power for the lawn and garden equipment. As an example, leaf blowers, weed trimmers and edgers often use lithium battery packs to provide power for the equipment. Once the equipment is no longer in use, the lithium ion battery pack is removed and recharged utilizing a wall charger. Lithium ion battery packs can be completely discharged and subsequently recharged without any significant reduction in the storage capacity of the battery. Due to the nature of lithium ion, and other battery types, a control circuit, including a microcontroller, is required to control the charging, discharging and overall health of the lithium ion battery. However, the processing capability contained within the control circuit is generally underutilized, and only configured to handle the battery management system (BMS).

SUMMARY

The present disclosure relates to a starter battery pack for use with a piece of outdoor power equipment, such as but not limited to a lawn tractor. More specifically, the starter battery pack includes an outer housing that encloses a plurality of individual battery cells. The battery pack includes a processing circuit configured to control one or more functions associated with the internal combustion engine and enclosed in the outer housing, according to some embodiments.

In one embodiment, a battery pack for use in power equipment is disclosed. The battery pack includes a housing, a plurality of rechargeable lithium-ion battery cells enclosed in the housing, a plurality of terminals, a processing circuit, and a communications interface. The plurality of terminals are electrically coupled to the plurality of rechargeable lithium-ion battery cells and are externally accessible from the housing. The plurality of terminals include a positive terminal, a negative terminal, and data terminals. The processing circuit is in communication with the data terminals and is configured to control a supply of electrical power from the plurality of rechargeable lithium-ion battery cells to the positive terminal and the negative terminal in response to receiving signals from the data terminals. The signals from the data terminals include operational information that includes at least a condition of an electric motor on power equipment coupled with the data terminals. The communications interface is coupled to the processing circuit and is configured to communicate with the processing circuit. The communications interface is configured to communicate over a wireless communication protocol to receive an identification of a type of power equipment coupled with the plurality of terminals. The processing circuit is configured to adjust one or more functions of the battery pack based upon identification data received from the communications interface. The identification data includes the identification of the type of power equipment that is coupled with the plurality of terminals.

In another embodiment, a battery pack for use in power equipment is disclosed. The battery pack includes a housing, a plurality of rechargeable lithium-ion battery cells enclosed in the housing, a plurality of terminals, a processing circuit, and a communications interface. The plurality of terminals are electrically coupled to the plurality of rechargeable lithium-ion battery cells and are externally accessible from the housing. The plurality of terminals include a positive terminal, a negative terminal, and bi-directional data terminals. The processing circuit is in communication with the bi-directional data terminals and is configured to control a supply of electrical power from the plurality of rechargeable lithium-ion battery cells to the positive terminal and the negative terminal in response to receiving signals from the bi-directional data terminals. The signals from the bi-directional data terminals include operational information that includes at least a condition of an electric motor on power equipment coupled with the bi-directional data terminals. The communications interface is coupled to the processing circuit and is configured to communicate with the processing circuit. The communications interface is configured to communicate over near-field communication (NFC) to receive an identification of a type of power equipment coupled with the plurality of terminals. The battery pack is configured to transmit information about a status of the plurality of rechargeable lithium-ion battery cells, the operational status of the electric motor on the power equipment coupled with the bi-directional data terminals, and the type of power equipment coupled with the plurality of terminals over a wireless protocol.

In another embodiment, a battery pack for use in power equipment is disclosed. The battery pack includes a housing, a plurality of rechargeable lithium-ion battery cells enclosed in the housing, a plurality of terminals, a processing circuit, and a communications interface. The plurality of terminals are electrically coupled to the plurality of rechargeable lithium-ion battery cells and are externally accessible from the housing. The plurality of terminals include a positive terminal, a negative terminal, and bi-directional data terminals. The processing circuit is in communication with the bi-directional data terminals and is configured to control a supply of electrical power from the plurality of rechargeable lithium-ion battery cells to the positive terminal and the negative terminal in response to receiving signals from the bi-directional data terminals. The signals from the bi-directional data terminals include operational information that includes at least an operational status of an electric motor on power equipment coupled with the bi-directional data terminals and a power request from a pushbutton start/stop control module. The communications interface is coupled to the processing circuit and is configured to communicate with the processing circuit. The communications interface is configured to communicate over near-field communication (NFC) to receive an identification of a type of power equipment coupled with the plurality of terminals. The battery pack is configured to transmit information about a status of the plurality of rechargeable lithium-ion battery cells, the operational status of the electric motor on the power equipment coupled with the bi-directional data terminals, and the type of power equipment coupled with the plurality of terminals over a wireless protocol.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION

Figure 1:
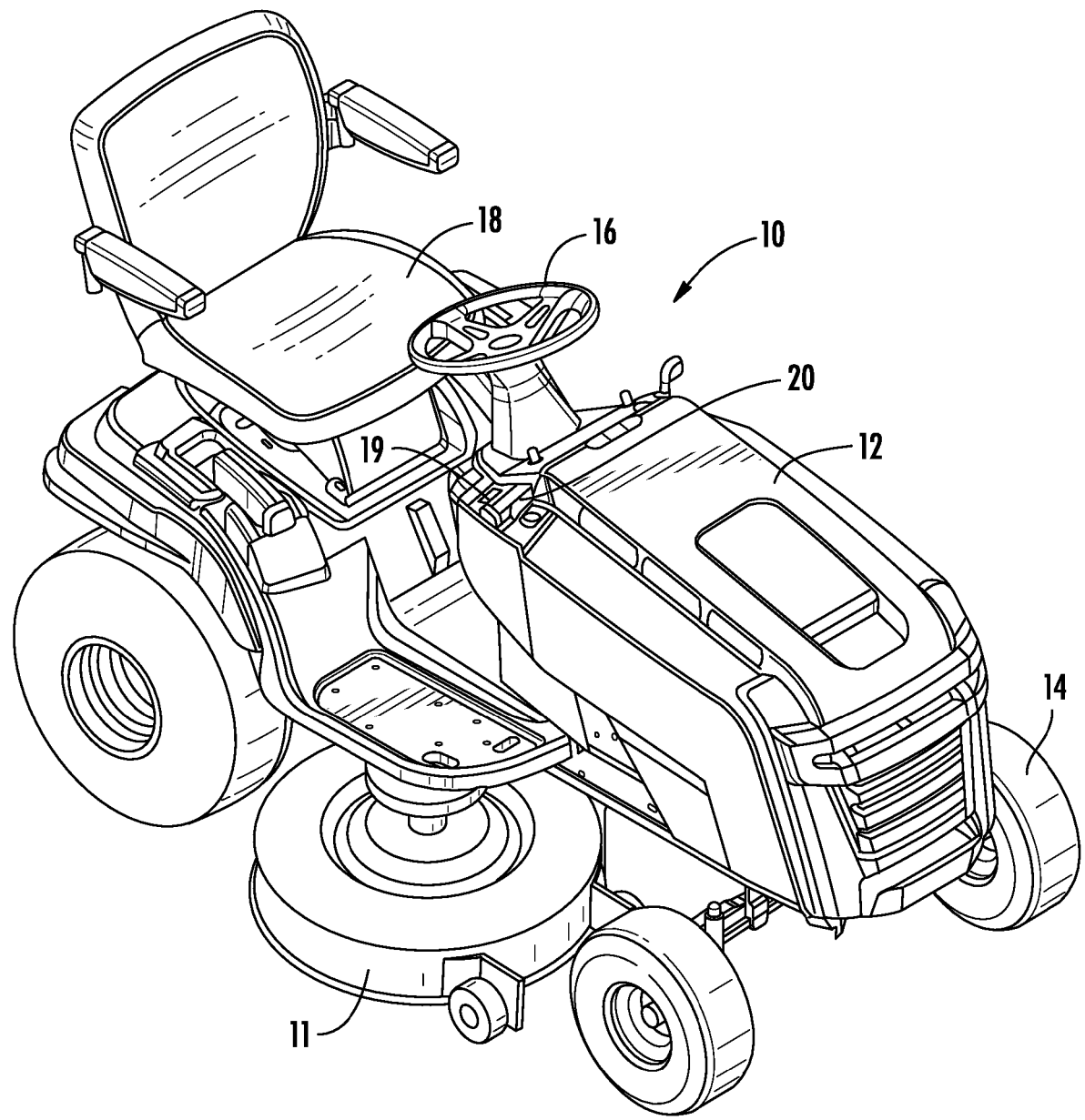
FIG. 1 is a front perspective view of a lawn tractor including the battery pack according to some embodiments.

The present disclosure is directed to an intelligent battery pack associated with a starting system for an internal combustion engine used with various types of outdoor power equipment. The drawing figures depict the use of the intelligent battery pack with a lawn tractor. However, it should be understood that the battery pack and starting system could be utilized with other types of outdoor power equipment such as with lawn mowers, riding tractors, snow throwers, pressure washers, tillers, log splitters, zero-turn radius mowers, walk-behind mowers, riding mowers, stand-on mowers, pavement surface preparation devices, industrial vehicles such as forklifts, utility vehicles, commercial turf equipment such as blowers, vacuums, debris loaders, overseeders, power rakes, aerators, sod cutters, brush mowers, sprayers, spreaders, etc.

FIG. 1 illustrates a riding lawn tractor 10 that includes a mowing assembly 11 mounted beneath a vehicle chassis 12 supported by four wheels 14. The lawn tractor 10 includes an internal combustion engine (not shown) that powers both the rear drive wheels and the mower blade contained within the mowing assembly 11. A steering wheel 16 allows an operator positioned in the seat 18 to control the movement of the lawn tractor 10, as is conventional. In the embodiment shown in FIG. 1, the lawn tractor 10 includes an ignition switch 19 that is used by the operator to start operation of the internal combustion engine. The ignition switch 19 could be a three position key switch or could be a push-button. The operation of the ignition switch 19 will be detailed below. The details of the lawn tractor 10 shown in FIG. 1 are meant of illustrative purposes only, since the lawn tractor 10 could have various different operator controls and physical configurations while falling within the scope of the present disclosure.

Figure 2:
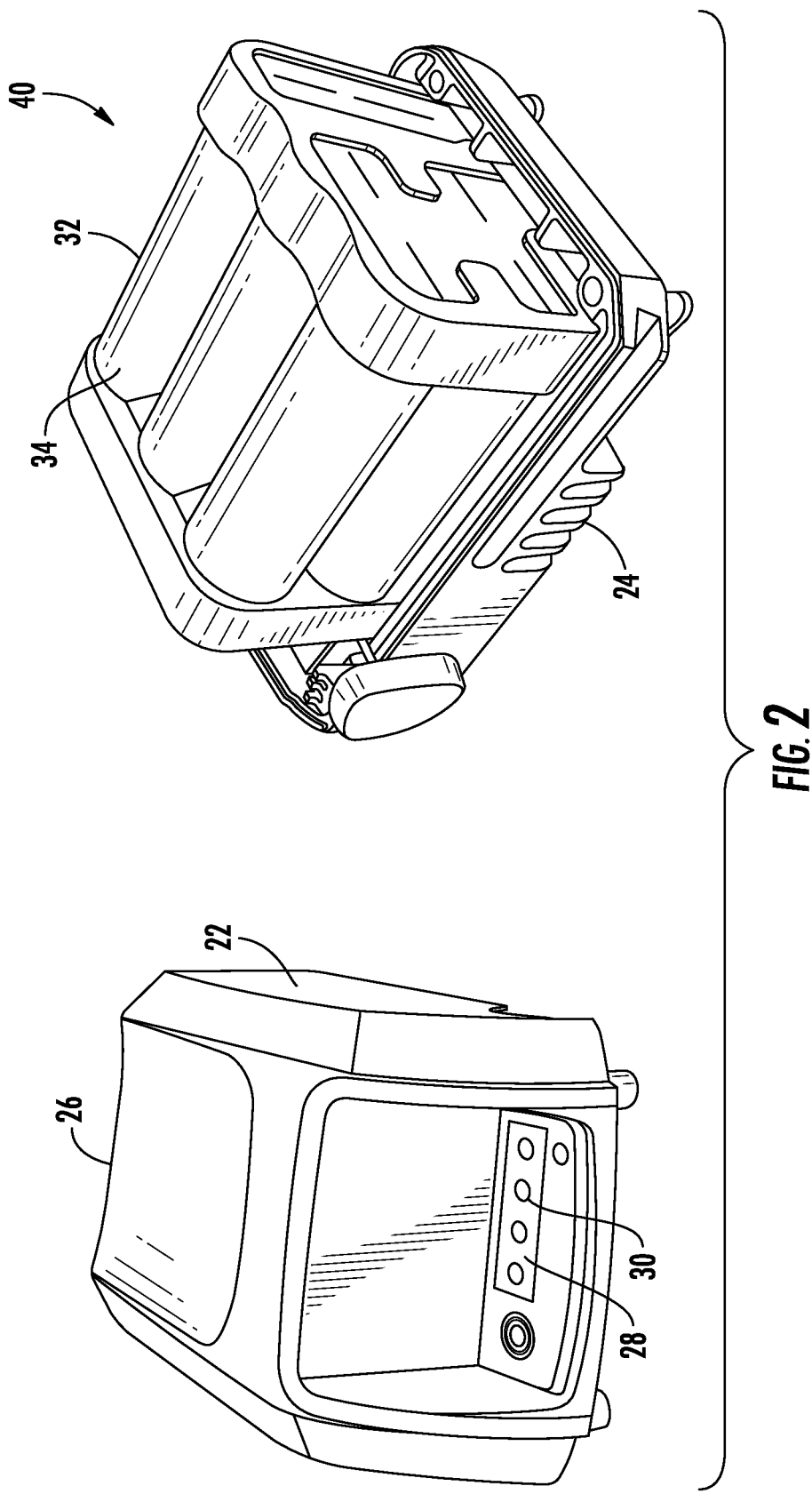
FIG. 2 is a series of perspective views of the battery pack according to some embodiments.

FIG. 2 illustrates one possible embodiment of a battery pack 40 constructed in accordance with the present disclosure. The battery pack 40 includes a two-piece outer battery housing 22 that includes a bottom portion 24 and a top portion 26. The top portion 26 includes a power level display 28 that includes a plurality of individual indicator lights 30. Although the embodiment shown in FIG. 2 includes multiple indicator lights 30, it is contemplated that the multiple indicator lights 30 could be replaced by a single LED that changes color depending upon the charge stored on the internal battery cell. As an example, the indicator lights 30 could be replaced by a single LED that changes color from green to yellow to red, depending upon the state of charge on the internal battery pack. Alternatively, the multiple indicator lights 30 could be replaced by a single LED that flashes, remains on in a steady state, or is turned off depending upon the charge level of the battery pack 40. Such embodiment would allow for a single color LED.

In the embodiment shown in FIG. 2, the battery pack 40 includes six individual battery cells 34 that are organized and connected to each other and are contained within the outer battery housing 22, as will be described in greater detail below. In the embodiment shown in FIG. 2, the six individual battery cells 34 are stacked in two rows each including three cells. However, it is contemplated that other configurations could be utilized while operating within the scope of the present disclosure. The size of the outer battery housing 22 is configured to accommodate the six battery cells 34, which provides for additional interior space for the charging circuit, the switching circuit, and the control circuit to be described below.

Figure 3:
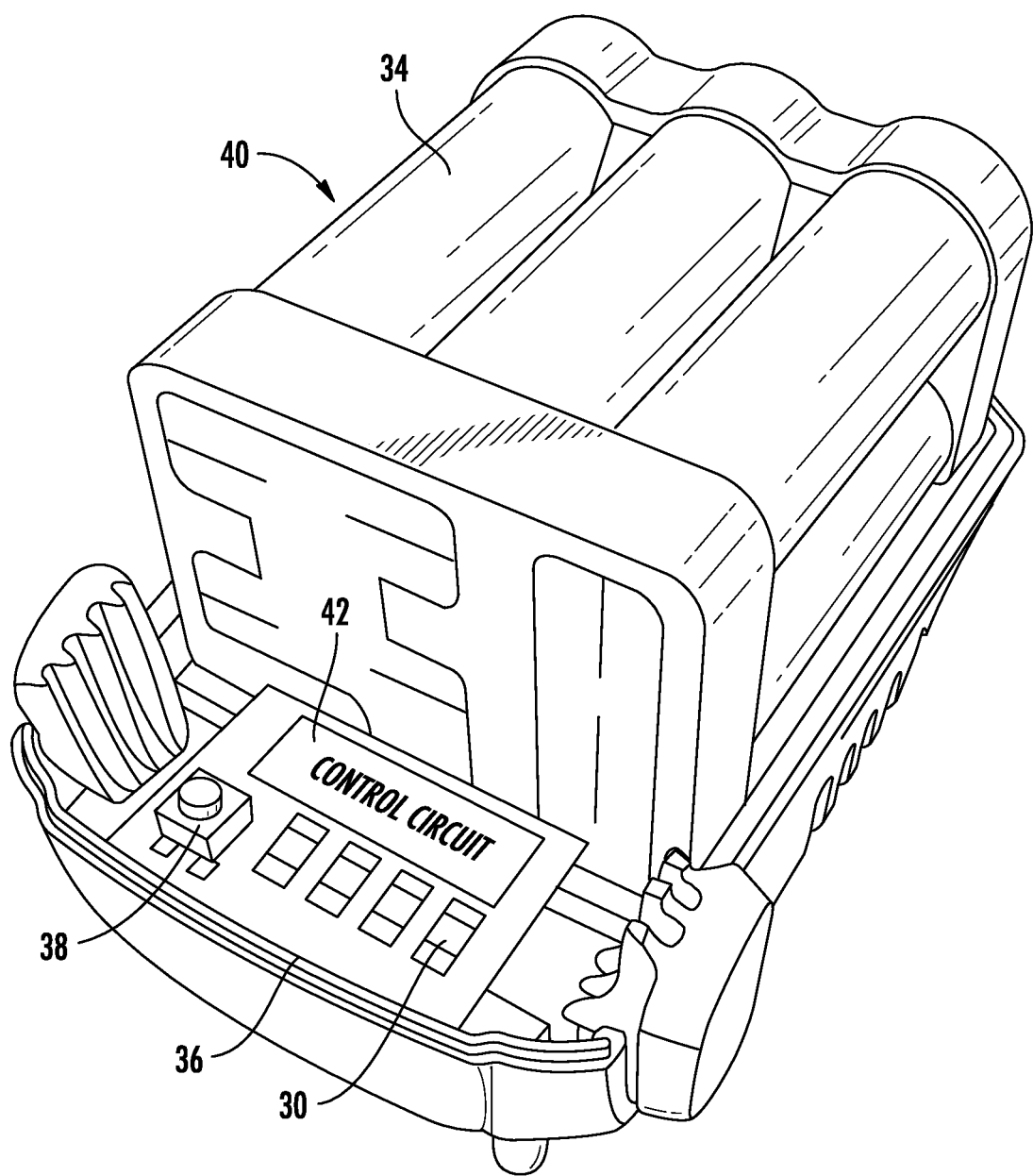
FIG. 3 is a front perspective view of the battery pack according to some embodiments.

FIG. 3 illustrates the circuit board 36 that includes the indicator lights 30. In addition, the circuit board 36 includes an activation switch 38 that allows the user to test the charge of the battery pack 32. For example, the indicator lights 30 may only provide an indication to the user of the charge of the battery pack 32 when the activation switch 38 is actuated by the user. The circuit board 36 is further shown to include a control circuit 42, which will be described in more detail below.

In the embodiment illustrated, each of the individual battery cells 34 of the battery pack 40 can be one of two different types of storage cells. In one embodiment, each of the cells 34 is a common lithium ion battery, referred to as an NMC (nickel magnesium cobalt) battery. The NMC battery cells may be configured to have a pre-defined voltage level. For example, each of the NMC battery cells in battery pack 34 may have a rating of 3.6 volts. In other embodiments, each of the battery cells 34 may be another type of lithium ion battery referred to as a lithium iron phosphate cell (LiFePO4, LFP). A lithium iron phosphate ("LFP") battery is a type of lithium ion rechargeable battery that is typically used for high power applications. An LFP battery allows for reduced protection circuitry as compared to an NMC battery, and typically offers a longer usable life, better power density, and is inherently safer. An LFP battery has a typical maximum charge capacity of 3.2 volts each in the embodiment shown in FIG. 3. In the present disclosure, both the LFP and NMC battery cells will be referred to as lithium ion battery cells.

In the embodiment illustrated, the six individual battery cells 34 of the battery pack 40 are believed to be able to provide enough current to start an internal combustion engine of the lawn tractor many times, to increase the number of starting attempts between required charging of the battery pack 32. However, it is contemplated that other battery cell arrangements may be utilized to provide sufficient power to starter motors of various sizes and configurations.

Figure 4:
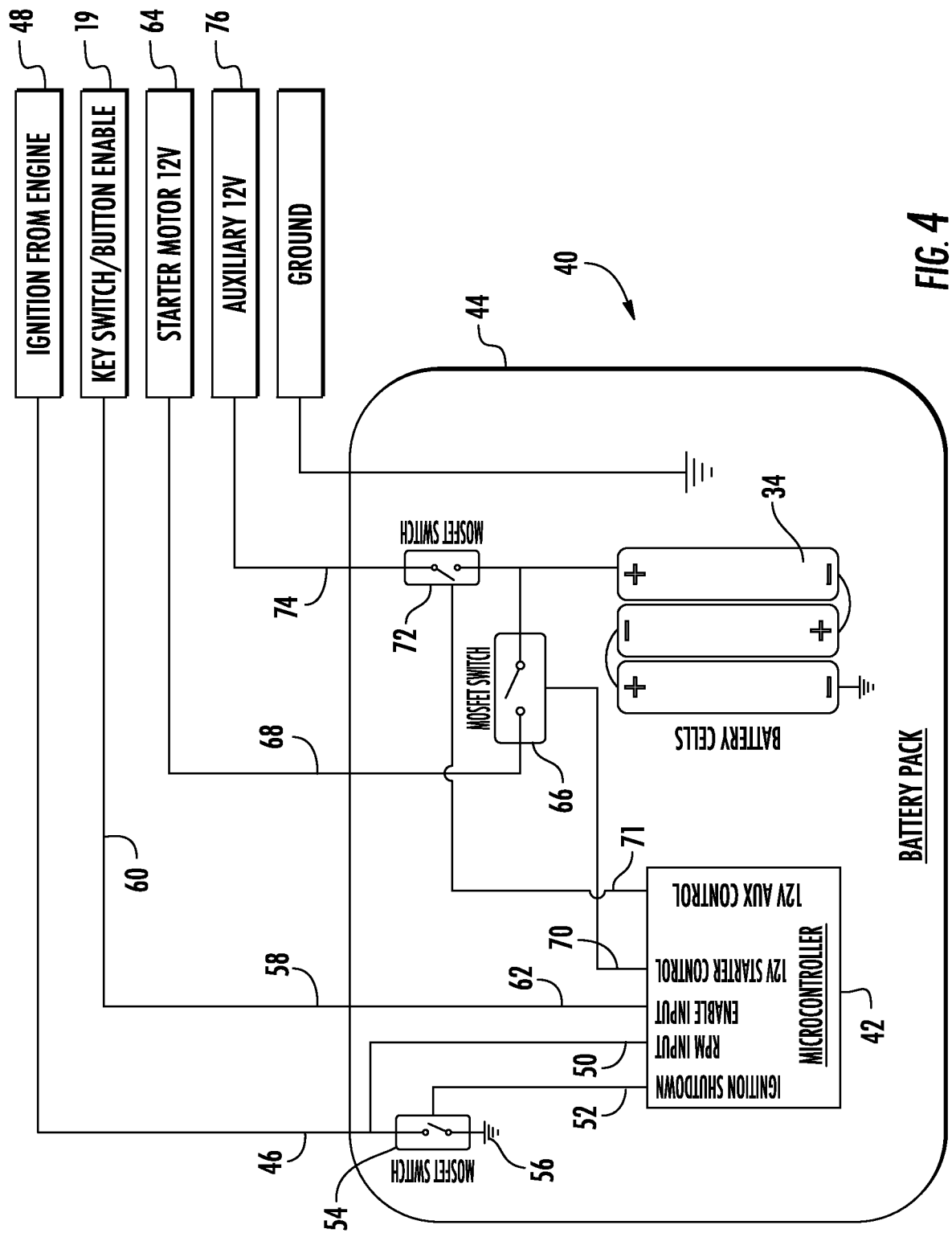
FIG. 4 is an electrical schematic illustration of a controller of the starter battery pack according to some embodiments.

FIG. 4 illustrates the operating configuration of a battery pack 40 according to some embodiments. The battery pack 40 is shown in FIG. 4 as including a series of individual battery cells 34 connected in series. However, it should be understood that a different number of battery cells 34 could be utilized and that the battery cells could be connected in series, parallel or series-parallel configurations depending upon the output requirements from the combination of the battery cells 34. The battery pack 40 includes the control unit 42 within an outer housing 44 schematically shown in FIG. 4. The control unit 42 is positioned to receive inputs from other systems associated with the operation of the internal combustion engine and to control operation of multiple switches as will be described in greater detail below.

As illustrated in FIG. 4, the battery pack 40 includes an ignition input terminal 46 that is connected to the ignition circuit 48, including an ignition coil, from the internal combustion engine. An ignition signal received at the ignition input terminal 46 is fed into the RPM input pin 50 of the control unit 42. The ignition signal from the ignition circuit 48 will include a series of pulses that correspond to the rotational speed of the internal combustion engine. By monitoring the pulses present at the RPM input pin 50, the control unit 42 will be able to determine whether the internal combustion engine is running or whether the internal combustion engine is not running.

In the embodiment shown in FIG. 4, the control unit 42 includes an ignition shutdown pin 52 connected to a shutdown switching element 54. The shutdown switching element 54 is connected between the ignition coil of the ignition circuit 48 of the internal combustion engine and ground 56. When the shutdown switching element 54 is in the closed condition, the ignition circuit 48 is connected directly to ground 56 which will ground the ignition coil. Grounding the ignition coil will either terminate operation of the internal combustion engine or will prevent starting of the internal combustion engine. When the shutdown switching element 54 transitions to the open condition shown in FIG. 4, the ignition circuit 48 would be ungrounded and thus allow for operation or starting of the internal combustion engine. In the embodiment shown in FIG. 4, the shutdown switching element 54 is a MOSFET switch that can transition between "open" and "closed" conditions through the application of a voltage to the MOSFET from the control unit 42 (e.g. via ignition shutdown pin 52). Although a MOSFET is described in one embodiment as the shutdown switching element 54, it should be understood that different types of switching elements, such as an SCR, transistor, IGBT or a relay, could be utilized while operating within the scope of the present disclosure.

In one embodiment, the battery pack 40 includes an enable terminal 58 that is connected to an ignition switch 19. The ignition switch 19 can be one of multiple different types, such as a multi-position key switch, a push button starter or any other type of device or switch that can generate an enable signal along line 60. As an illustrative example, when the ignition switch 19 is a multi-position key switch, when the key switch is moved to a cranking position to start the engine, a signal is present along the line 60, which in turn is received at the enable input pin 62 of the control unit 42. The signal may be a digital low signal or a digital high signal, in certain configurations. Likewise, when the ignition switch 19 is a push button, depressing the push button creates a similar high signal along line 60, which is also received at the enable input pin 62.

When the control unit 42 receives the enable signal at the enable input pin 62, the control unit 42 can then determine whether starting of the internal combustion engine should be allowed to occur. For example, if the control unit 42 determines that the internal combustion engine is running, a starting action is not necessary, and could damage a starting motor 64 or the internal combustion engine itself. If the control unit 42 determines that the internal combustion engine is not running, based upon the signal present at the RPM input pin 50, the control unit 42 can initiate operation of the starter motor 64. To do so, the control unit 42 controls the operational state of a starter switching element 66 which is positioned between the series of battery cells 34 and the starter motor 64. When the starter switching element 66 is in the closed condition, the voltage from the series of battery cells 34 is present at the 12-volt starter terminal 68 of the battery pack 40. The 12-volt starter terminal 68 is connected directly to the starter motor 64 to provide the required twelve volts needed to operate the starter motor. In the embodiment shown in FIG. 4, the starter switching element 66 is a MOSFET switching element, the condition of which can be controlled by the control unit through the voltage present at the starter control pin 70. Although a MOSFET is described in one embodiment as the starter switching element 66, it should be understood that different types of switching elements, such as an SCR, transistor, IGBT or a relay, could be utilized while operating within the scope of the present disclosure. In other configurations, the battery pack 40 may be configured to provide more than 12 volts or less than 12 volts to the starter terminal, as required by the specific starter motor.

After the starter switching element 66 is in the "closed" condition, the battery voltage is supplied to the starter motor 64 through the starter terminal 68. In one configuration, the control unit 42 monitors the signals from the ignition circuit 48 through the RPM input pin 50 to determine whether the internal combustion engine starts. In other configurations, the control unit 42 monitors a current of the starter motor to determine whether the internal combustion engine starts. For example, the starter pinion will get removed from the crankshaft once the internal combustion engine starts, resulting in reduced starter current draw. Once the control unit 42 determines that the internal combustion engine has started (e.g. via the signal received at the RPM input pin 50), the control unit 42 transitions the starter switching element 66 to the "open" condition to disconnect the battery cells 34 from the starter motor 64.

In addition to providing voltage from the series of battery cells 34 to the starter motor 64 to initiate operation of the starter motor, the control unit 42 can control the condition of an auxiliary switching element 72 which is connected between the series of battery cells 34 and an auxiliary terminal 74. The auxiliary terminal 74 provides power to a series of auxiliary devices and loads 76 of the lawn tractor though an auxiliary bus. These auxiliary loads can include lights, radio, a display, gauges or any other components on the vehicle that could be powered when the internal combustion engine of the tractor is not operating. As an illustrative example, if the operator of the lawn tractor wishes to operate the radio or lights of the tractor without turning the tractor on, the operator could move the key switch to an auxiliary position, which would be sensed by the control unit 42 at the enable input pin 62. Since the internal combustion engine is not running (as determined by the control unit 42 based upon the signal present at the RPM input pin 50), the control unit 42 may determine that the engine is not running and provide power to the auxiliary loads. Based upon these two inputs, the control unit 42 can then move the auxiliary switching element 72 to the "closed" condition and supply battery power to the auxiliary loads 76 for a limited period of time. In other embodiments, and as will be described in more detail below, the control unit 42 may include one or more additional enable inputs, such as an auxiliary enable which would allow the control unit 42 to receive a signal indicating that the key switch is placed into an auxiliary position or state, thereby instructing the control unit 42 to provide power to the auxiliary 12V system associated with the auxiliary devices and loads 76 described above.

As can be understood by the above description, the inclusion of the ignition input terminal 46 on the battery pack 40 allows the control unit 42 to monitor the operation of the internal combustion engine. In such a manner, the control unit 42 is able to detect whether the internal combustion engine is running and allows the control unit 42 to disconnect the series of battery cells 34 from any auxiliary loads after the user has stopped operation of the internal combustion engine. This feature would prevent the battery pack 40 from draining the battery cells 34 if the ignition switch 19 is left in the on position. In addition, the control unit 42 will be able to ground the ignition circuit 48 of the internal combustion engine if desired.

The inclusion of the ignition input terminal 46 on the battery pack 40 also allows the ignition switch 19 to provide additional functions when the ignition switch 19 is a push button. Specifically, when the internal combustion engine is running, the user can again depress the push button to stop operation of the internal combustion engine. When the control unit 42 is sensing operation of the engine through the RPM input pin 50 and then receives a high signal at the enable input pin 62, the control unit 42 can stop the engine by grounding the ignition circuit 48 through the shutdown switching element 54. As stated above, when the shutdown switching element 54 is in its "closed" condition, the ignition circuit 48 of the internal combustion engine is grounded, which stops operation of the internal combustion engine. Examples of use of this feature could be utilized in a pressure washer in which the internal combustion engine includes a spray wand having a trigger switch. When the trigger switch is initially pulled, the trigger switch will function in the same manner as a push button starting switch. Upon detecting the trigger switch, the microcontroller would start the internal combustion engine. When the trigger switch is released, the control unit 42 would sense such change of state and terminate operation of the internal combustion engine through the shutdown switching element 54. In some embodiments, the control unit 42 may include a time delay circuit to prevent shutdown of the internal combustion engine immediately upon the user releasing the trigger switch. In one example, the time delay circuit may provide a ten second time delay. However, other time delay values are also contemplated. Other possible uses are also contemplated as being within the scope of the present disclosure.

Figure 5:
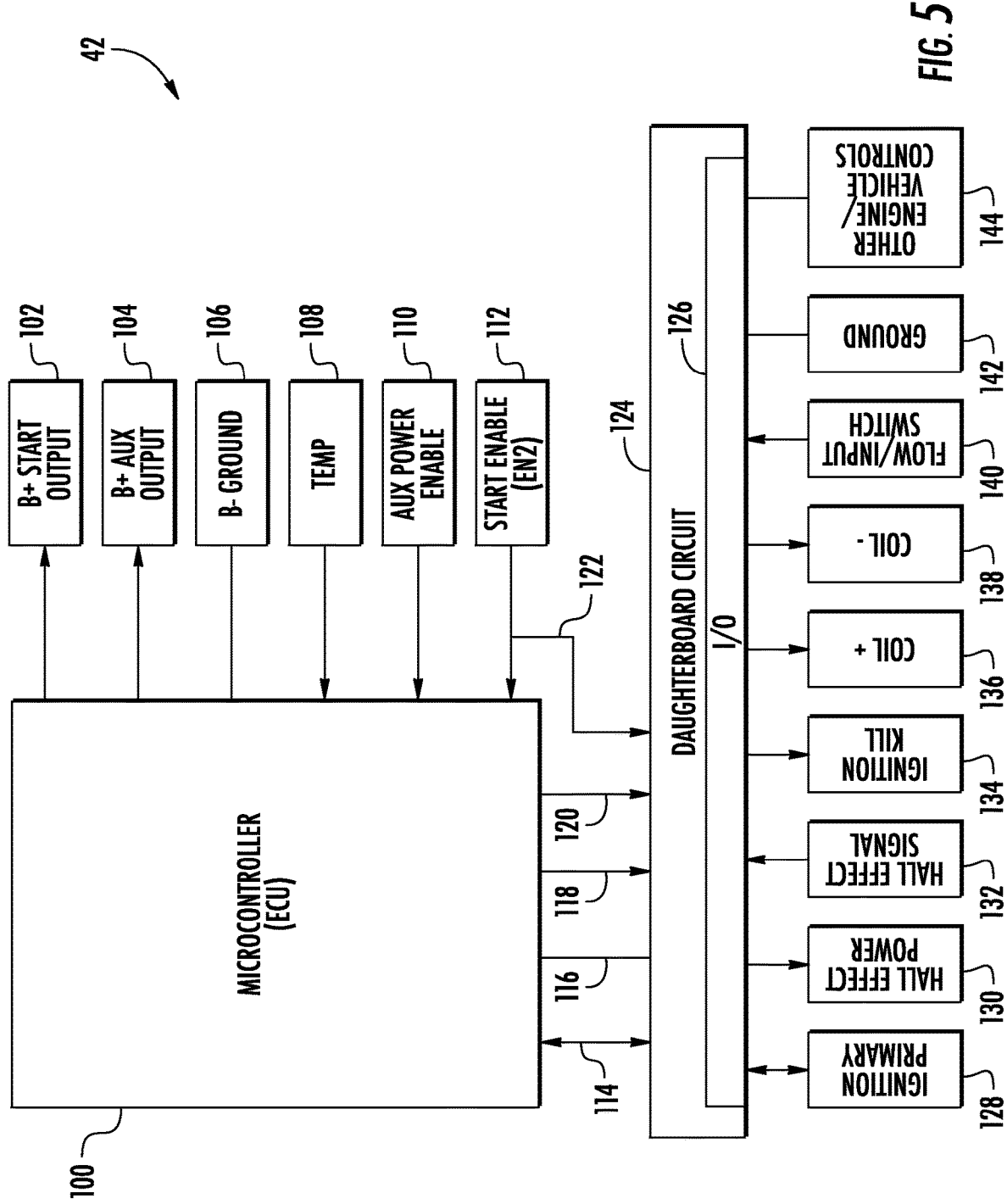
FIG. 5 is a block diagram of a control circuit interface of the battery pack with an outdoor power equipment, according to some embodiments.

In some embodiments, the control unit 42 may be configured to provide additional functionality to the internal combustion engine and/or the outdoor power equipment in general. For example, the control unit 42 may be configured to provide motor control functionality to the internal combustion engine. Turning now to FIG. 5, a schematic drawing illustrating the control unit 42 is shown, according to some embodiments. The control unit may include a microcontroller 100. In some embodiments, the microcontroller 100 may have a number of input/output (I/O) connections connected to one or more components within the battery pack 40. According to some embodiments, the I/O connections may include a battery positive (B+) start output 102, a battery positive (B+) auxiliary output 104, a battery negative (B−) ground output 106, a temperature input 108, an auxiliary power enable output 110, and a start enable output 112.

The microcontroller 100 may further include a number of I/O lines for communicating with one or more other circuits. The I/O lines can include a communications bus 114, a ground (or common) bus 116, an auxiliary power output 118, a daughter enable output 120, and a start enable output 122. In some embodiments, the start enable output 122 may be jumpered to the start enable output 112. The control unit 42 may further include a daughterboard circuit 124. In some embodiments, the daughterboard circuit 124 may be configured to operate as a multiplexor to allow for additional data to be provided to the microcontroller 100 via the daughterboard. In other embodiments, the daughterboard circuit 124 may include a microprocessor and/or a memory circuit for performing certain computations. The daughterboard circuit 124 may then provide the processed data to the microcontroller 100. The daughterboard circuit 124 may also be referenced as an interface module.

In one embodiment, the communication bus 114 may be configured as a serial data bus. For example, the communication bus 114 may be configured to operate using a CAN bus communication protocol, a K-line communication protocol, a universal serial bus (USB) communication protocol, and/or an RS-232 protocol. It is further contemplated that other communication protocols may be used to communicate between the microcontroller 100 and the daughterboard circuit 124, including wired communication protocols, wireless communication protocols (RF, LoRa, Zigbee, Bluetooth, Bluetooth Low Energy, Wi-Fi, Cellular, etc.), or a combination thereof. In some embodiments, the communication bus 114 may provide bi-lateral (e.g. two way) communication between the microcontroller 100 and the daughterboard circuit 124. In other embodiments, the communication bus114 may provide unilateral (e.g. one way) communication from the daughterboard circuit 124 to the microcontroller 100.

The daughterboard circuit 124 may further include a number of I/O ports 126 for interfacing with one or more systems associated with an internal combustion engine. The I/o ports may be general purpose I/O ports (GPIO), pulse width modulation outputs, transistor output drivers (e.g. MOSFET drivers, BJT drivers, IGBT drivers, etc.), analog I/O, digital I/O, and the like. As shown in FIG. 5, the I/O ports 126 may interface with a primary ignition circuit 128, a Hall Effect power circuit 130, a Hall Effect signal circuit 132, an ignition kill circuit 134, a positive coil terminal 136, a negative coil terminal 138, a flow/input switch circuit 140, a ground connection 142, and/or other engine/vehicle controls 144.

The ignition primary circuit 128 may communicate with the daughterboard circuit 124 via a bi-directional communication line and using an I/O port 126 of the daughterboard circuit 124. For example, the ignition primary circuit 128 may communicate with the daughterboard circuit 124 via a GPIO port, an analog I/O port, or a digital I/O port, depending on the signal provide by the ignition primary circuit 128. In one embodiment, the ignition primary circuit 128 receives a signal from the daughterboard to generate a spark, for use in initiating the combustion cycle within a cylinder of the internal combustion engine. Further, the ignition primary circuit 128 may provide a signal to the daughterboard circuit indicating when a spark has been generated (e.g. thereby initiating the combustion cycle) for one or more spark plugs in the system. This data may be used for ignition control, as will be described in more detail below.

The hall effect power circuit 130 and the hall effect signal circuit 132 may be associated with a hall effect sensor located within the internal combustion engine. While the above embodiment is described as using a hall effect sensor, other sensor types, such as proximity switches, transducers, speed sensors, current sensors, time of flight (ToF) sensors, and the like may also be used. The hall effect power circuit 130 may provide power to the hall effect sensor. In one embodiment, the power may be supplied via the daughterboard circuit 124. In other embodiments, the daughterboard circuit 124 may be in communication with a switch or power supply to provide an instruction to provide power to the hall effect sensor. The hall effect signal circuit 132 may provide data to the daughterboard circuit 124 from the hall effect sensor. In one embodiment, the hall effect signal circuit 132 provides a voltage indicating a distance of the hall effect sensor from a magnet producing a magnetic field. In one embodiment, a hall effect sensor may be placed near a portion of a crankshaft within the internal combustion engine. One or more magnetic elements may be coupled to the crankshaft. The hall effect sensor may then measure the distances to the one or more magnetic elements to determine a distance or position of the crank shaft. This information may be used to determine a crank angle of the engine, as will be described in more detail below.

The ignition kill circuit 134 may be configured to deactivate one or more spark plugs on the internal combustion engine to stop ignition, and therefore stop the engine. In one embodiment, the ignition kill circuit 134 may include a switch to short the one or more spark plugs to ground. The switch may be configured to be controlled via a signal from the daughterboard circuit 124. In other embodiments, the switch may be located within the daughterboard circuit 124, thereby allowing the daughterboard circuit 124 to directly short the spark plugs to stop operation of the motor. In other embodiments, the daughterboard circuit 124 may control an enable circuit for the ignition circuit to allow the ignition to be enabled or disabled.

The positive coil terminal 136 and the negative coil terminal 138 may be coupled to an electronic fuel injector (EFI) actuator for controlling the fuel injection into one or more cylinders of the internal combustion engine. While the embodiment shown in FIG. 5 illustrates only one set of coil connections, it is contemplated that multiple coil connections may be possible for controlling more than one EFI actuator. In the embodiment shown in FIG. 5, the daughterboard circuit 124 may be configured to control the rate and timing of fuel injection into the engine, as will be described in more detail below.

The flow/input switch circuit 140 may be coupled to a flow sensor for detecting a flow of a liquid associated with the internal combustion engine. In some embodiments, the internal combustion engine may be used to provide power to a cleaning device, such as a power washing device. The power washer may include a flow switch to detect a flow of water that occurs when a user actuates a flow valve (e.g. such as depressing a trigger on the power washing wand) which causes some water to flow through the power washer. The flow sensor may detect the flow of water through the actuated valve and or a portion of the power washer, and provide a signal to the daughterboard circuit 124 indicating that flow is detected. In some embodiments, this input may be communicated to the microcontroller 100 which can then initiate a starting procedure to start the internal combustion engine. The ground connection 142 may be connected to a ground of the internal combustion engine to provide a common ground. Finally, the other engine/vehicle controls 144 may include connections to various systems or components of the engine or vehicle, such as sensors, attachment controls, speed controls, safety components, etc. While the embodiment of FIG. 5 shows the above described circuits and connections, it is contemplated that the daughterboard may be configured to include more or fewer I/O ports for communicating with various systems associated with an internal combustion engine.

Figure 6:
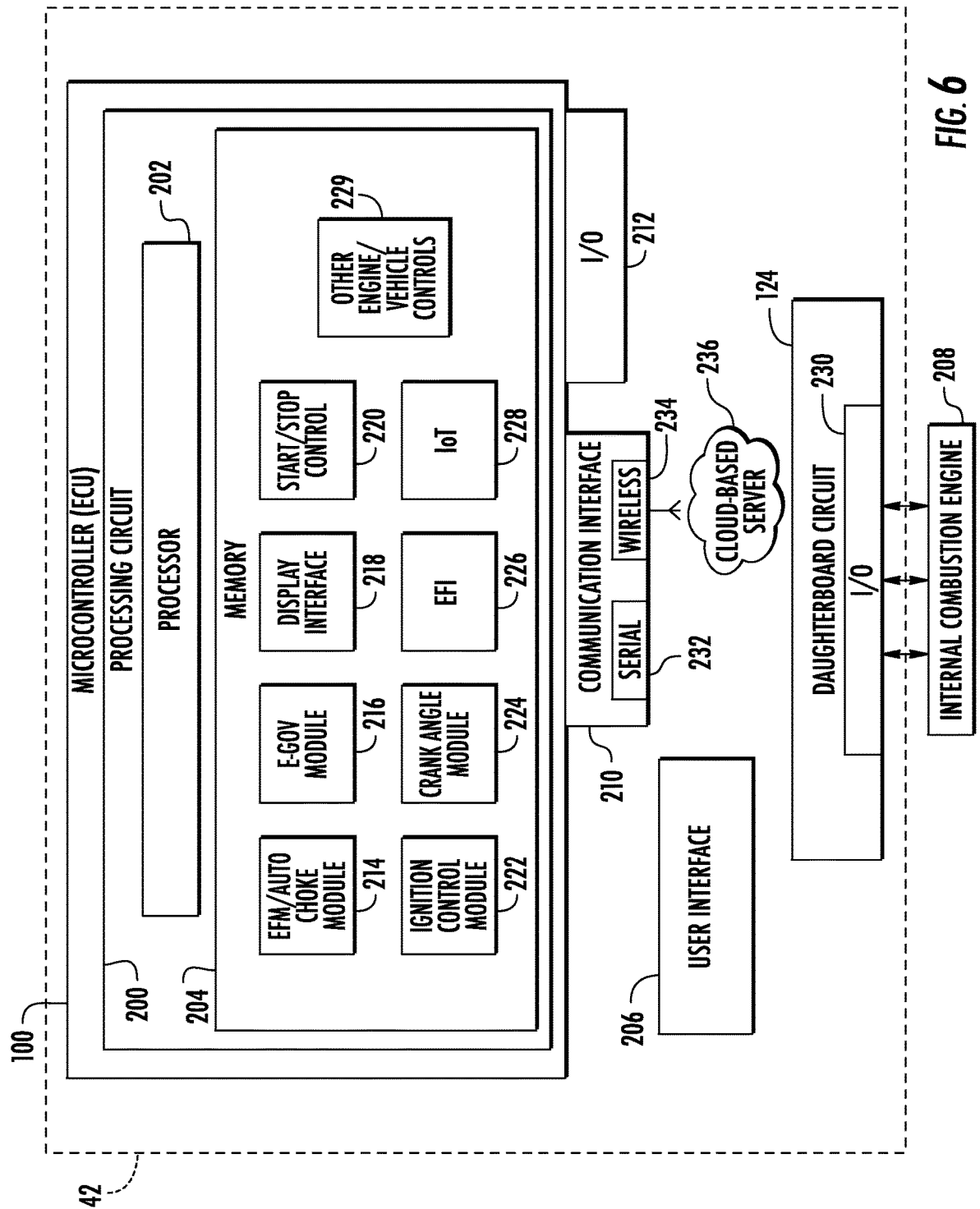
FIG. 6 is a block diagram of the control circuit of FIG. 5, according to some embodiments.

Turning now to FIG. 6, a block diagram showing one configuration of the control unit 42 is shown. The control unit 42 includes the microcontroller 100, as described above. The control unit further includes the daughterboard circuit 124, as described above. The control unit 42 includes a processing circuit 200. The processing circuit is shown to include a processor 202 and a memory 204. The processor 202 may be general purpose or specific purpose processor, an application specific integrated circuit (ASIC), one or more field programmable gate arrays (FPGAs), a group of processing components (e.g. parallel processing units), a neural network processing system, or other applicable processing circuits. The processor 202 may be configured to execute computer code or instructions stored in memory 202 or received from other computer readable media, such as physical media (e.g. CD-ROM, DVD-ROM, flash drive, etc.), network drives, remote servers, mobile devices, etc. The memory 204 may include one or more devices (e.g. memory units, memory devices, storage devices, etc.) for storing data and/or computer code for completing and/or facilitating the functions and processes described in the present disclosure. The memory 204 may include random access memory (RAM), read-only memory (ROM) hard drive storage (physical or solid state), temporary storage, non-volatile memory, flash memory, optical memory, or any other suitable memory component for storing software objects and/or computer instructions. The memory 204 may include database components, object code components, script components, or any other type of information structure for supporting the various functions and information structures described in the present disclosure. The memory 204 may be communicably connected to the processor via the processing circuit and may include computer code for executing (e.g. by the processor) one or more processes described herein.

The microcontroller 100 may further be in communication with a user interface 206 associated with an internal combustion engine 208 and/or a piece of outdoor power equipment associated with the internal combustion engine 208. The control unit 42 may further include a communication interface 210 and an I/O interface 212. The I/O interface may include the I/O 102-112 described above in the embodiments described in relation to FIG. 5.

The memory 204 may include a number of modules configured to include multiple modules to perform various functions associated with the internal combustion engine 208 and/or outdoor power equipment associated with the internal combustion engine 208. As shown in FIG. 6, the memory 204 includes an electronic fuel management (EFI)/automatic choke module 214, an electronic governor (e-gov) module 216, a display interface 218, a pushbutton start/stop control module 220, an ignition control module 222, a crank angle determination module 224, an electronic fuel injection (EFI) module 226, an internet of things (IoT) module 228, and an other engine/vehicle controls module 229.

The EFM module 214 may be configured to operate a choke function on a carbureted internal combustion engine. In one embodiment, the EFM module 214 may be configured to control one or more electric motors associated with controlling a choke plate of a carburetor. In one embodiment, the EFM module 214 may interface with one or more I/O ports 230 on the daughterboard circuit 124 to control the electric motors associated with controlling the choke plate. For example, the I/O ports 230 of the daughterboard circuit 124 may include one or more switched outputs (e.g. MOSFET switched outputs) for controlling a power and direction of power provided to the one or more electric motors associated with controlling the choke plate of the internal combustion engine. The daughterboard circuit 124 may further include one or more inputs to receive an input related to the EFM control of the internal combustion engine 208. For example, the daughterboard circuit 124 may include an analog input for receiving an analog temperature input which can be used to control the choking of the engine. For example, as the engine temperature increases, the choke plate may be opened further to allow additional air into the carburetor, thereby reducing the suction pressure within the carburetor. Other inputs may include an engine speed input, a user controlled throttle input, an engine run timer, an engine cycle counter, etc. These inputs can be communicated to the EFM module 214 via a serial communication port 232 on the communication interface 210 to allow the EFM module to determine a required position of the choke plate. The serial communication port 232 may utilize multiple serial communication protocols and/or hardware, including universal asynchronous receiver-transmitter (UART) communication, a serial peripheral interface bus (SPI), including MOSI, MISO, SCK, CS, and I2C, serial data lines (SDA), serial clock lines (SCL), universal serial bus (USB), RS-232, k-line, CAN, and the like. The EFM module 214 may use the inputs as feedback to accurately control the flow of air into a carburetor.

The e-gov module 216 may be configured to control one or more electric motors associated with a throttle plate within a carbureted internal combustion engine. The electric motors may be configured to move the throttle plate to control the air-fuel mixture provided to the internal combustion engine cylinders. In some embodiments, the electric motors may be stepper motors. In other embodiments, the electric motors may be coupled to a geared system for controlling the position of the throttle plate. In some embodiments, the geared system may be configured such that the gearing ratio is sufficiently high to maintain the position of the throttle plate without requiring the electric motor to provide torque to maintain the position. This concept is described in U.S. patent application Ser. No. 14/702,435, titled "Electronic Governor System and Load Sensing System" and filed May 1, 2015, the contents of which are herein incorporated by reference in their entirety.

In one embodiment, the e-gov module 216 may interface with one or more I/O ports 230 on the daughterboard circuit 124 to control the electric motors associated with controlling the throttle plate. For example, the I/O ports 230 of the daughterboard circuit 124 may include one or more switched outputs (e.g. MOSFET switched outputs) for controlling a power and direction of power provided to the one or more electric motors associated with controlling the throttle plate of the internal combustion engine. The switched outputs may be configured as pulse width modulated (PWM) outputs. The daughterboard circuit 124 may further include one or more inputs to receive an input related to the e-gov control of the internal combustion engine 208. For example, the daughterboard circuit 124 may include an analog input for receiving an engine speed which can be used to control the throttle. For example, as the engine speed increases, the throttle plate may be positioned to reduce the air-fuel mixture provided to the internal combustion engine to maintain a speed of the engine. The daughterboard circuit 124 may further include a number of GPIO for other inputs and/or outputs associated with e-governor control. These can include throttle position sensors, user throttle controls, etc. The EFM module 214 may communicate with the daughterboard circuit 124, and thereby the various components of the e-gov system, via the serial communication port 232 on the communication interface 210. In some embodiments, the e-gov module 216 may use the inputs as feedback to accurately control the fuel-air mix provided to the internal combustion engine 208.

The display interface module 218 may be configured to interface with the user interface 206 associated with the control unit 42. In some embodiments, the user interface may be integrated into a battery housing, such as a display for providing battery related data to the user. In other embodiments, the user interface 206 may be configured to provide various data to a user related to the battery, as well as the internal combustion engine. For example, the display interface module 218 may provide engine parameters to the user interface 206, such as RPM, engine temperature, fuel level, throttle level, etc. While shown as coupled to the control unit 42, the user interface 206 may be remote from the control unit. For example, the user interface 206 may be coupled to a portion of the outdoor power equipment, such as an operator control station, on a pushbar assembly, or other location on the outdoor power equipment that allows for an operator to easily access the information provided by the user interface 206. In some embodiments, the control unit 42 can communicate to the user interface 206 via the serial port 232.

The pushbutton start/stop control module 220 may be configured to interface with a starter motor of the internal combustion engine. For example, the pushbutton start/stop control module 220 may interface with the start enable I/O 112, the B+ start output 102 and the B– ground output 106 to control the starter motor. For example, the pushbutton start/stop control module 220 may receive an indication that a user wishes to start the internal combustion engine 208, such as when the user actuates a switch or button associated with the start enable I/O. As a further example, the pushbutton start/stop control module 220 may interface with the B+ start output 102, the B+ auxiliary output 104, the B− ground output 106, the temperature input 108, the auxiliary power enable output 110, and the start enable I/O 112. In one embodiment, the I/O, such as the start enable I/O 112, the B+ start output 102, and the B− ground output 106 may be part of the microcontroller 100 I/O 212. However, in some embodiments, the above I/O may be associated with the I/O 230 of the daughterboard circuit 124. Furthermore, in other embodiments, the I/O may be a combination of the microcontroller I/O 212 and the daughterboard circuit I/O 230. In one embodiment, the pushbutton start/stop control module 220 may control a GPIO for communication with the start/stop input (e.g. start enable 112), as well as a switched output (e.g. a MOSFET switch) which can be used to control power to the starter motor. In one embodiment, the switched output is a low side switch for switching the ground connection to the coil of the starter motor (e.g. B− ground), to allow current to flow from the battery and through the starter motor. However, in other embodiments, the switched output may be a high side switch to control the application of voltage from the battery to the starter motor. In some embodiments, the pushbutton start/stop control module 220 may also control a switch connected to the ignition system, such as the ignition kill circuit 134 to allow for the pushbutton start/stop control module 220 to kill the ignition when receiving an input from the user indicating a desire to stop operation of the internal combustion engine 208. For example, the pushbutton start/stop control module 220 may communicate with the daughterboard circuit 124 via the serial communication port 232. The daughterboard circuit 124 may then activate the ignition kill circuit 134 to stop combustion, and thereby stop operation of the internal combustion engine 208.

The ignition control module 222 may be configured to control ignition associated with the internal combustion engine 208. For example, the ignition control module 222 may control the firing of one or more spark plugs within the internal combustion engine 208. In one embodiment, the ignition control module 222 may be configured to enable the one or more spark plugs to spark, thereby providing ignition. This can allow the ignition control module 222 to control when ignition is occurring within the internal combustion engine 208. In some embodiments, the ignition control module 222 interfaces with the ignition system via the microcontroller I/O 212. In other embodiments, the ignition control module 222 may interface with the ignition system via the daughterboard circuit I/O 230. For example, the ignition control module 222 may interface with the ignition primary circuit 128 and/or the ignition kill circuit 134, as described above.

The crank angle module 224 may be configured to time the firing of the one or more spark plugs within the internal combustion engine 208 based on one or more operating conditions. For example, the internal combustion engine 208 may typically fire the spark plugs at 24° before top dead center during normal operation. However, it may be advantageous to fire the spark plugs at a smaller angle (such as 4° before top dead center) during certain operating conditions, such as starting. It is understood that the above crank angles are for illustrative purposes and it is contemplated that multiple crank angles are contemplated as applicable to different operating conditions present on the internal combustion engine 208. In some embodiments, the crank angle module 224 may determine a cranking position based on the position of a crank shaft within the internal combustion engine. The position of the crank shaft may be determined by the crank angle module 224 based on data provided by the daughterboard circuit 124. For example, the daughterboard circuit 124 may receive position data via the hall effect signal circuit 132. The hall effect sensor associated with the hall effect signal circuit 132 may provide position data regarding the crank shaft, which may then be transmitted to the daughterboard circuit 124 for communication to the crank angle module 224. While the above description illustrates the use of a hall effect sensor to determine the position of the crank shaft, other sensors and methods of determining the position of the crank shaft are also contemplated, such as those described above.

The EFI module 226 may be configured to control one or more fuel injectors associated with a fuel injection system of the internal combustion engine 208. In some embodiments, the EFI module 226 may be in communication with a throttle control of the internal combustion engine to increase or decrease the volume and/or frequency of fuel provided to each cylinder during operation. In some embodiments, the EFI module 226 may be in communication with other modules, such as the ignition control module 222 and/or the crank angle module 224 to determine when to actuate the one or more fuel injectors. In some embodiments, the EFI module 226 may communicate with the coils of the fuel injectors via the coil circuits 136 and 138 by communicating with the daughterboard. In some embodiments, the EFI module 226 may be integrated into the daughterboard 230 and communicate directly to the fuel injectors via the coil circuits 136 and 138.

The Internet-of-Things (IoT) module 228 module may be configured to interface with one or more remote devices via a wireless communication port 234. In one embodiment, the wireless communication port 234 may be integrated into the control module 100, or as part of the control unit 42. In some embodiments, the wireless interface may be integrated into the daughterboard 230 to allow for wireless communication to be added to the control unit 42. In some embodiments, the wireless communication module 234 may be configured to communicate using one or more wireless protocols. For example, the wireless communication module 234 may utilize wireless protocols including Wi-Fi (e.g. 802.11x), Wi-Max, cellular (e.g. 3G, 4G, LTE, CDMA, etc.), LoRa, Zigbee, Zigbee Pro, Bluetooth, Bluetooth Low Energy (BLE), Near Field Communication (NFC), Z-Wave, 6LoW-PAN, Thread, RFID, and other applicable wireless protocols. In some embodiments, the wireless communication module 234 may be in communication with a cloud-based server 236. The cloud-based server 236 may be configured to interface with multiple programs and interfaces, and be accessible via the world wide web (e.g. the Internet). This can allow a user to access the control unit 42 via any device that has access to the world wide web. For example, a user may be able to access the control unit 42 via a mobile device such as an internet connected computer, a smartphone (e.g. iPhone, Android phone, Windows phone), a tablet computer (e.g. iPad, Android Table, Microsoft Surface, etc.), or any other internet connected device. In some embodiments, the cloud-based server 236 may provide one or more web-based applications for interfacing between a user device and the control unit 42, and thereby the associated outdoor power equipment. In other embodiments, the user's device may include a client-side application, which can interface with the control unit 42 via the cloud-server 236. In still further embodiments, the user's device may include one or more client-side applications which can be configured to communicate directly to the control unit via the wireless communication interface 234, such as via Bluetooth, BLE, NFC, Zigbee, etc.

The other engine/vehicle controls module 229 may be configured to interface with other systems or components associated with the internal combustion engine 208 and/or an associated vehicle or equipment. In some embodiments, the other engine/vehicle controls module 229 may communicate with the other systems or components via the I/O module 212. For example, the other engine/vehicle controls module 229 may be configured to control various functions of the internal combustion engine 208 and/or the associated vehicle or equipment, including speed controls, implement (e.g. blades, blowers, etc.) control, suspension control, speed control, attachment control, lighting systems, comfort systems (e.g. heat, charging circuits, radios, etc.), and other applicable systems, as needed. In some embodiments, the other engine/vehicle controls module 229 is configurable to allow for controls to be implemented based on the configuration of the internal combustion engine 208, and/or the vehicle or equipment. In some embodiments, the other engine/vehicle controls module 229 may be configured to determine the type of internal combustion engine 208 and/or vehicle or equipment it is coupled to based on a user setting via the user interface 206. In other embodiments, the other engine/vehicle controls module 229 may be configured to determine the type of internal combustion engine 208 and/or vehicle or equipment it is coupled to based on the presence of one or more I/O points. In still further embodiments, the other engine/vehicle controls module 229 may be configured to determine the type of internal combustion engine 208 and/or vehicle or equipment it is coupled to based on a communication received via the communication interface 210. The other engine/vehicle controls module 229 may then execute one or more functions based on determining the type of internal combustion engine 208 and/or vehicle or equipment it is coupled to.

The IoT module 228 may include one or more software applications configured to process data or instructions received via the wireless communication module 234. In some embodiments, the IoT module may process data provided by one of the above described software modules 214-226, and provide that data to a user device or to the cloud-based server 236 via the wireless communication interface 234. While the IoT module 228 is shown as integrated into the microcontroller 100, it is contemplated that the IoT module 228 may integrated into the daughterboard circuit 230 in some embodiments, and communicate with the microcontroller 100 via the communication interface 210.

As discussed above, the communication interface module 210 can provide an interface between components such as the daughterboard circuit 124 and the microcontroller. In some embodiments, the communication module 210 may communicate via the serial interface 232 to the daughterboard circuit 124 and/or the microcontroller 200 using one or more serial communication protocols, such as those described above.

As stated above, in some embodiments, the control modules 214-228 may be integrated into the microcontroller. In other embodiments, some or all of the control modules 214-228 may be integrated into the daughterboard circuit 230, which may also include a processing circuit similar to the processing circuit 202 described above. Further, it is contemplated that more or fewer control modules may be used for a given application. Additional control modules may include GPS modules, compass modules, microelectromechanical systems (MEMS) modules, traction control modules, autonomous operation modules, and the like.

Figure 7:
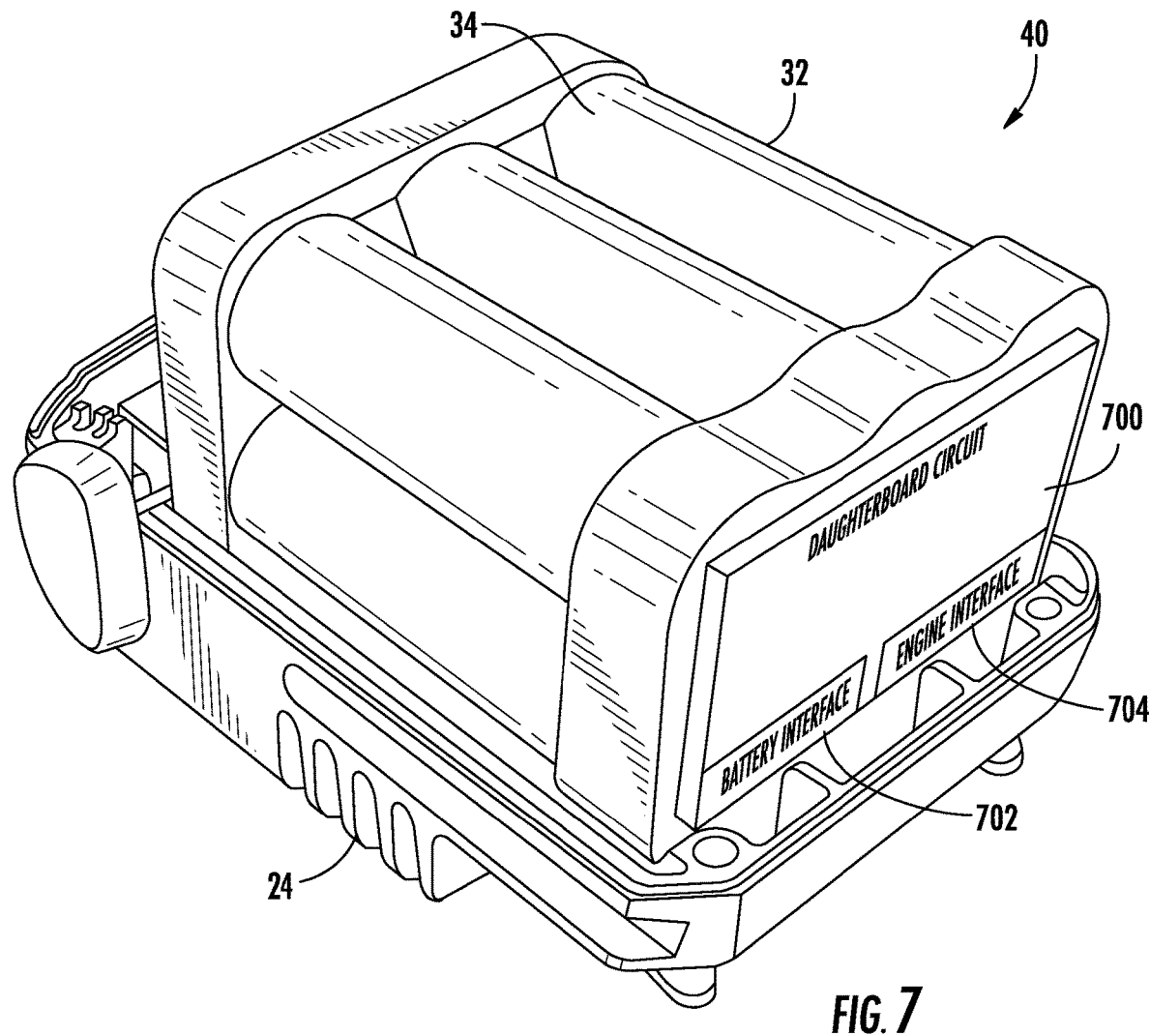
FIG. 7 is a perspective view of a battery pack with an internally mounted daughterboard circuit, according to some embodiments.

Turning now to FIG. 7, a perspective view of the internals of battery pack 40. As shown in FIG. 7, a daughterboard circuit 700 is shown attached at a proximal end of the battery pack. In one embodiment, the daughterboard circuit 700 is similar to the daughterboard circuit 124 as described above. The daughterboard circuit 700 is shown to include a battery interface 702 and an engine interface 704. In some embodiments, the daughterboard circuit 700 may be mechanically coupled to the battery pack 40 during manufacturing of the battery pack 40. In other embodiments, the daughterboard 700 may be coupled to the internals of the battery pack 40 after manufacturing during a final assembly process (e.g. by an OEM). In still further embodiments, the daughterboard circuit 700 may be configured to include a microcontroller (such as microcontroller 100 described above) and to further integrate the BMS of the battery pack 40 into a single circuit board/module.

The engine interface 704 may be the same as the I/O 126 described above, and be configured to access various systems and components associated with the engine. The engine interface 704 may include a connector or other coupling device to provide an interface between the battery pack 40 and the engine. For example, a user may be able to plug a wiring harness into the engine interface 704. In other embodiments, the engine interface may couple to one or more connection points on the out housing 22 of the battery pack 40. A receptacle for the battery pack 40 may include corresponding connection points for interfacing with the one or more systems/components within the engine for communication with the daughterboard circuit. The battery interface 702 may be configured to interface with a microcontroller or battery management system controller associated with the battery pack 40, as described above. The battery interface 702 may include a coupling device to allow for a connector cable to be connected between the battery interface 702 and the microcontroller 100 of the battery pack 40. In other embodiments, the battery interface 702 may include a connector for coupling directly to a circuit board associated with the microcontroller 100/BMS of the battery pack 40.

Figure 8:
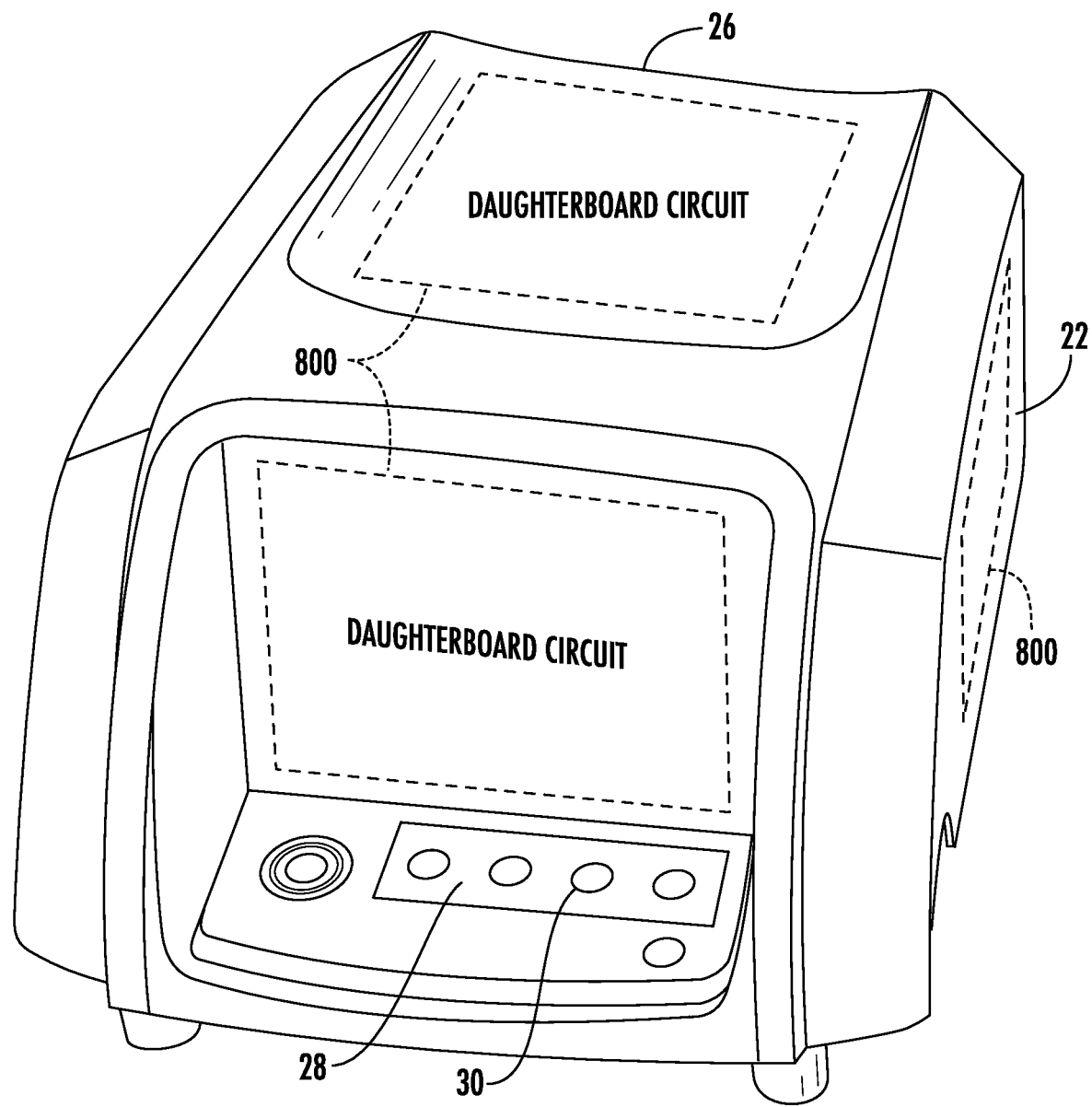
FIG. 8 is a perspective view of a battery pack with a separately mounted daughterboard circuit, according to some embodiments.

Turning now to FIG. 8, a perspective view of the battery housing 22 is shown, according to some embodiments. The battery housing 22 shows multiple potential locations for an externally mounted daughterboard circuit 800. The externally mounted daughterboard 800 shown in FIG. 8 may be the same as daughterboard 124 described above. In some embodiments, the daughterboard circuit 800 may have a housing which may be configured to couple to one or more external faces of the battery housing 22. Further, the daughterboard 800 may have an engine interface and a battery interface as described above in FIG. 7. As shown in FIG. 8, the daughterboard 800 may be configured to mount to any face of the battery housing 22. In some embodiments, the daughterboard 800 may be configured to mount to the bottom of the battery housing and can be configured as an interface between the battery housing 22 and a battery receptacle on the engine. This can allow for the daughterboard circuit to interface with one or more contacts within the battery receptacle which may be in electronic communication with one or more systems or components within the engine or outdoor power equipment, as described above. Further, the daughterboard 800 may contain a battery interface, as described above which can communicate between the daughterboard 800 and the microcontroller/BMS of the battery pack 40, as well as passing the signals and power from the battery pack 40, through the daughterboard circuit 800, and to the engine, and vice versa.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A battery pack for use in power equipment, the battery pack comprising:
    a housing;
    a plurality of rechargeable lithium-ion battery cells enclosed in the housing;
    a plurality of terminals electrically coupled to the plurality of rechargeable lithium-ion battery cells and externally accessible from the housing, the plurality of terminals including a positive terminal, a negative terminal, and data terminals;
    a processing circuit in communication with the data terminals and configured to control a supply of electrical power from the plurality of rechargeable lithium-ion battery cells to the positive terminal and the negative terminal in response to receiving signals from the data terminals, the signals from the data terminals including operational information that includes at least a condition of an electric motor on power equipment coupled with the data terminals; and
    a communications interface, the communications interface being coupled to the processing circuit and configured to communicate with the processing circuit, wherein the communications interface is configured to communicate over a wireless communication protocol to receive an identification of a type of power equipment coupled with the plurality of terminals;
    wherein the processing circuit is configured to adjust one or more functions of the battery pack based upon identification data received from the communications interface, wherein the identification data includes the identification of the type of power equipment coupled with the plurality of terminals.

2. The battery pack of claim 1, wherein the wireless communication protocol is near-field communication (NFC).

3. The battery pack of claim 2, further comprising an Internet of Things (IoT) module, the IoT module being configured to receive information from the data terminals and transmit information received from the data terminals via a second wireless communication protocol, the second wireless communication protocol being different than the wireless communication protocol.

4. The battery pack of claim 2, wherein the data terminals are a plurality of input and output (I/O) points for interfacing with one or more components of the power equipment coupled with the plurality of terminals.

5. The battery pack of claim 2, wherein the data terminals are configured to communicate operational information from a prime mover of the power equipment coupled with the plurality of terminals, wherein the operational information includes at least a speed and a temperature of the prime mover.

6. The battery pack of claim 5, wherein the prime mover is an internal combustion engine, and wherein the data terminals are further configured to monitor the internal combustion engine to determine if the internal combustion engine is running.

7. The battery pack of claim 6, wherein the data terminals are configured to determine if the internal combustion engine is running by monitoring a speed of the internal combustion engine by communicating with an engine speed sensor.

8. The battery pack of claim 5, wherein one of the plurality of data terminals is configured to monitor an implement on the power equipment coupled with the data terminals.

9. The battery pack of claim 5, wherein the processing circuit comprises an electronic governor control module configured to govern the prime mover.

10. The battery pack of claim 1, wherein the battery pack is configured to use in powering a starter motor to start an internal combustion engine.

11. A battery pack for use in power equipment, the battery pack comprising:
    a housing;
    a plurality of rechargeable lithium-ion battery cells enclosed in the housing;
    a plurality of terminals electrically coupled to the plurality of rechargeable lithium-ion battery cells and externally accessible from the housing, the plurality of terminals including a positive terminal, a negative terminal, and bi-directional data terminals;
    a processing circuit in communication with the bi-directional data terminals and configured to control a supply of electrical power from the plurality of rechargeable lithium-ion battery cells to the positive terminal and the negative terminal in response to receiving signals from the bi-directional data terminals, the signals from the bi-directional data terminals including operational information that includes at least an operational status of an electric motor on power equipment coupled with the bi-directional data terminals; and
    a communications interface, the communications interface being coupled to the processing circuit and configured to communicate with the processing circuit, wherein the communications interface is configured to communicate over near field communication (NFC) to receive an indication of a type of power equipment coupled with the plurality of terminals;
    wherein the battery pack is configured to transmit information about a status of the plurality of rechargeable lithium-ion battery cells, the operational status of the electric motor on the power equipment coupled with the bi-directional data terminals, and the type of power equipment coupled with the plurality of terminals over a wireless communication protocol.

12. The battery pack of claim 11, further comprising an Internet of Things (IoT) module, the IoT module being configured to receive and transmit information from the bi-directional data terminals about the operational status of the electric motor on the power equipment coupled with the bi-directional data terminals and receive and transmit the status of the plurality of rechargeable lithium-ion battery cells via Bluetooth.

13. The battery pack of claim 11, wherein at least one of the plurality of bi-directional data terminals is configured to communicate with an implement on the power equipment.

14. The battery pack of claim 11, wherein the processing circuit is configured to adjust one or more functions of the battery pack based upon a signal received from the communications interface, wherein the signal includes the type of power equipment coupled with the plurality of terminals.

15. The battery pack of claim 11, wherein at least one of the bi-directional data terminals are configured to communicate operational information from a prime mover of the power equipment coupled with the plurality of bi-directional data terminals, wherein the operational information includes at least a speed and a temperature of the prime mover.

16. The battery pack of claim 15, wherein the prime mover is an internal combustion engine, and wherein at least one of the plurality of data terminals is configured to monitor the internal combustion engine to determine if the internal combustion engine is running.

17. The battery pack of claim 11, wherein the processing circuit comprises an electronic governor control module configured to govern the electric motor.

18. A battery pack for use in power equipment, the battery pack comprising:
a housing;
a plurality of rechargeable lithium-ion battery cells enclosed in the housing;
a plurality of terminals electrically coupled to the plurality of rechargeable lithium-ion battery cells and externally accessible from the housing, the plurality of terminals including a positive terminal, a negative terminal, and bi-directional data terminals;
a processing circuit in communication with the bi-directional data terminals and configured to monitor and control a supply of electrical power from the plurality of rechargeable lithium-ion battery cells to the positive terminal and the negative terminal in response to receiving signals from the bi-directional data terminals, the signals from the bi-directional data terminals including operational information that includes at least an operational status of an electric motor on power equipment coupled with the bi-directional data terminals and a power request from a pushbutton start/stop control module; and
a communications interface, the communications interface being coupled to the processing circuit and configured to communicate with the processing circuit, wherein the communications interface is configured to communicate over near field communication (NFC) to receive an identification of a type of power equipment coupled with the plurality of terminals;
wherein the battery pack is configured to transmit information about a status of the plurality of rechargeable lithium-ion battery cells, the operational status of the electric motor on the power equipment coupled with the bi-directional data terminals, and the type of power equipment coupled with the plurality of terminals over a wireless communication protocol.

19. The battery pack of claim 18, further comprising an Internet of Things (IoT) module, the IoT module being configured to receive and transmit information from the bi-directional data terminals about the operational status of the electric motor on the power equipment coupled with the bi-directional data terminals and receive and transmit the status of the plurality of rechargeable lithium-ion battery cells via Bluetooth.

20. The battery pack of claim 18, wherein the processing circuit is configured to adjust one or more functions of the battery pack based upon a signal received from the communications interface, wherein the signal includes the identification of the type of power equipment coupled with the plurality of terminals.

* * * * *